(12) United States Patent
Lee et al.

(10) Patent No.: US 11,249,953 B2
(45) Date of Patent: Feb. 15, 2022

(54) METHOD AND APPARATUS FOR SHARING BIG DATA USING BLOCK CHAIN

(71) Applicant: Penta Security Systems Inc., Seoul (KR)

(72) Inventors: Seok Woo Lee, Seoul (KR); Duk Soo Kim, Seoul (KR); Sang Gyoo Sim, Seoul (KR); Min Woo Nam, Seoul (KR); Kwon Koo Kwak, Seoul (KR); Jae Yeon Yoon, Seoul (KR)

(73) Assignee: PENTA SECURITY SYSTEMS INC., Seoul (KR)

( * ) Notice: Subject to any disclaimer, the term of this patent is extended or adjusted under 35 U.S.C. 154(b) by 174 days.

(21) Appl. No.: 16/262,414

(22) Filed: Jan. 30, 2019

(65) Prior Publication Data
US 2020/0242081 A1 Jul. 30, 2020

(30) Foreign Application Priority Data
Jan. 30, 2019 (KR) .......................... 10-2019-0012054

(51) Int. Cl.
*G06F 17/30* (2006.01)
*G06F 16/176* (2019.01)
*G06F 16/16* (2019.01)
*G06F 16/182* (2019.01)
*H04L 9/06* (2006.01)

(52) U.S. Cl.
CPC .......... *G06F 16/176* (2019.01); *G06F 16/164* (2019.01); *G06F 16/1824* (2019.01); *G06F 16/1834* (2019.01); *H04L 9/0643* (2013.01); *H04L 2209/38* (2013.01)

(58) Field of Classification Search
CPC ...... G06F 16/27; G06F 16/13; G06F 16/1837; G06F 16/10; G06F 16/24; G06F 16/156; G06N 3/00; G06N 5/00; G05B 13/00
USPC ....... 707/722, 736, 758, 821; 706/12, 14, 45
See application file for complete search history.

(56) References Cited

U.S. PATENT DOCUMENTS

| | | | |
|---|---|---|---|
| 10,581,805 B2* | 3/2020 | Simons | G06Q 20/401 |
| 2015/0067002 A1 | 3/2015 | Shvachko et al. | |
| 2015/0278244 A1 | 10/2015 | Shvachko et al. | |
| 2017/0161439 A1 | 6/2017 | Raduchel et al. | |
| 2018/0109541 A1 | 4/2018 | Gleichauf | |
| 2020/0092292 A1* | 3/2020 | Patel | H04L 9/32 |
| 2020/0118127 A1* | 4/2020 | Miller | G06Q 20/389 |
| 2021/0042266 A1 | 2/2021 | Shvachko et al. | |

FOREIGN PATENT DOCUMENTS

| | | |
|---|---|---|
| JP | 2016-530636 A | 9/2016 |
| KR | 10-1936757 B1 | 1/2019 |

OTHER PUBLICATIONS

Shvachko et al., "The Hadoop Distributed File System", 2010, IEEE. (Year: 2010).*

* cited by examiner

*Primary Examiner* — Hung D Le
(74) *Attorney, Agent, or Firm* — Goldilocks Zone IP Law

(57) ABSTRACT

Provided are a device and method for sharing big data using a blockchain. The method of sharing big data using a blockchain includes receiving a search condition from a user terminal, searching a blockchain network for metadata meeting the received search condition and acquiring found metadata, acquiring shared data stored in a distributed storage using the acquired metadata, and transmitting the acquired shared data to the user terminal.

8 Claims, 7 Drawing Sheets

METHOD AND APPARATUS FOR SHARING BIG DATA USING BLOCK CHAIN

CLAIM FOR PRIORITY

This application claims priority to Korean Patent Application No. 2019-0012054 filed on Jan. 30, 2019 in the Korean Intellectual Property Office (KIPO), the entire contents of which are hereby incorporated by reference.

BACKGROUND

1. Technical Field

Example embodiments of the present invention relate in general to a device and method for sharing big data using a blockchain and more specifically to a technology for facilitating sharing and use of big data by managing and distributing big data collected from multiple data sharers on the basis of a block chain and a distributed storage.

2. Related Art

With the proliferation of data communication technology, numerous pieces of data generated by various subjects are shared and consumed in real time, and accordingly, big data technologies are attracting attention. A big data technology is to extract values from a large number of data sets beyond an existing database management level and analyze extraction results.

In general, common characteristics of big data include the amount of data, data generation velocity, and the variety of forms. Recently, new characteristics include veracity which represents whether collected data is accurate, variability which represents that data has different meanings according to a subject or method of analyzing the data and making a decision, and visualization, whereby data is processed to be understandable by users.

As a big data processing technique for analyzing and using big data having such a variety of characteristics, various methods including the distributed data processing technology of MapReduce and the like are under discussion. However, for distributed data processing, existing methods require a single service provider to have an expensive distributed storage system or a security system for preventing an external attack.

Meanwhile, the blockchain technology for containing data in blocks, connecting the blocks in a chain form, and simultaneously copying and storing the chain in numerous computers is attracting attention recently. However, the blockchain technology involves a process of calculating and verifying a hash value and the like in order to maintain the integrity of data. Therefore, the blockchain technology is not appropriate for storing a large amount of data.

SUMMARY

Accordingly, example embodiments of the present invention are provided to substantially obviate one or more problems due to limitations and disadvantages of the related art.

Example embodiments of the present invention provide a method of sharing big data using a blockchain.

Example embodiments of the present invention also provide a device for sharing big data using a blockchain.

In some example embodiments, a method of sharing big data using a blockchain is provided.

In other example embodiments, a device for sharing big data using a blockchain is provided.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
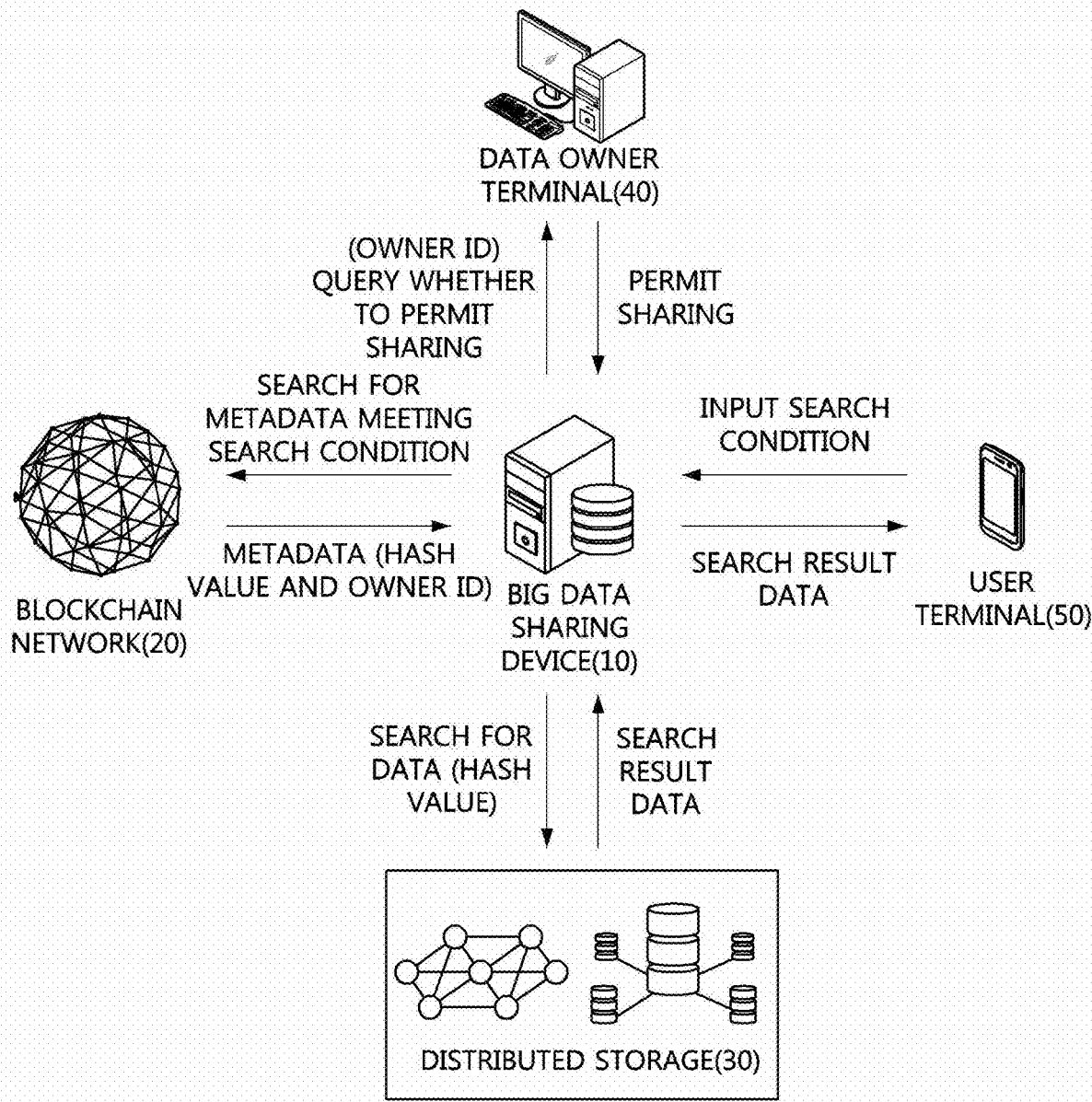
FIG. 1 is a conceptual diagram illustrating operation of a device and method for sharing big data using a blockchain according to an example embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

FIG. 1 is a conceptual diagram illustrating operation of a device and method for sharing big data using a blockchain according to an example embodiment of the present invention.

Referring to FIG. 1, elements for a method of sharing big data using a blockchain may include a big data sharing device 10 which provides a big data sharing service according to a search request, a user terminal 50 which is provided with a search service, a blockchain network 20 which stores and manages metadata of search result data in blocks, a distributed storage 30 which stores the search result data corresponding to the metadata in a distributed manner, and/or a data owner terminal 40 which generates various kinds of data and provides the generated data to other users for sharing.

The data owner terminal 40 is a terminal which provides its own data for big data sharing. The data owner terminal 40 may also serve as a node constituting the blockchain network 20 and may further serve as an individual node constituting the distributed storage 30.

The blockchain network 20 is composed of a plurality of nodes connected in a wired or wireless manner. The plurality of nodes may generate metadata of the various kinds of data which has been provided by the data owner terminal 40 for sharing, generate blocks using the generated metadata, and generate a blockchain by connecting the generated blocks together. The generated blockchain is equally distributed to individual nodes constituting the blockchain network 20 and stored therein such that the integrity of data may be ensured.

Meanwhile, the various kinds of data provided by the data owner terminal 40 may be stored in the separate distributed storage 30. The distributed storage 30 is a storage for storing actual data, which is accessible through the metadata stored in the blockchain network 20, in a distributed manner. Individual nodes constituting the distributed storage 30 may also serve as nodes of the blockchain network 20 and may further serve as the data owner terminal 40.

The big data sharing device 10 is an agent which provides a big data sharing service to the user terminal 50 using the blockchain network 20 and the distributed storage 30 and may be implemented as a server. The big data sharing device 10 may also serve as at least one of a code of the blockchain network 20, a node constituting the distributed storage 30, and the data sharing terminal 40.

A representative example in which the method of sharing big data using a blockchain according to an example embodiment of the present invention is performed may be a search service based on big data sharing. Specifically, referring to FIG. 1, the user terminal 50 may access the big data sharing device 10 and input a search condition. The big data sharing device 10 may search for metadata of the search condition through the blockchain network 20. The blockchain network 20 may provide found metadata to the big data sharing device 10. Examples of metadata may be a hash value of data to be actually used as big data, an identity (ID) of an owner, and the like.

When the metadata is acquired through the blockchain network 20, the big data sharing device 10 may search the distributed storage 30 for data corresponding to the acquired metadata and acquire search result data according to the metadata from the distributed storage 30. The big data sharing device 10 may provide the search result data, which is acquired from the distributed storage 30, to the user terminal 50.

Meanwhile, when the search result data acquired by the big data sharing device 10 from the distributed storage 30 has been encrypted or it is determined that the metadata acquired through the blockchain network 20 does not contain the owner's permission for sharing, the big data sharing device 10 may check the data owner terminal 40 using owner information included in the metadata, query the checked data owner terminal 40 whether to permit sharing with the user terminal 50, and acquire whether to permit sharing from the data owner terminal 40. A message for querying whether to permit sharing may include an ID of the user terminal 50. In this case, the big data sharing device 10 may provide the search result data to the user terminal 50 as long as a permission for sharing is acquired from the data owner terminal 40.

Examples of individual nodes constituting the blockchain network 20 or the distributed storage 30, the big data sharing device 10, the data owner terminal 40, or the user terminal 50 may be a desktop computer, a laptop computer, a smart phone, a tablet personal computer (PC), a mobile phone, a smart watch, smart glasses, an e-book reader, a portable multimedia player (PMP), a portable game machine, a navigation device, a digital camera, a digital multimedia broadcasting (DMB) player, a digital audio recorder, a digital audio player, a digital video recorder, a digital video player, a personal digital assistant (PDA), etc. capable of communication.

Figure 2:
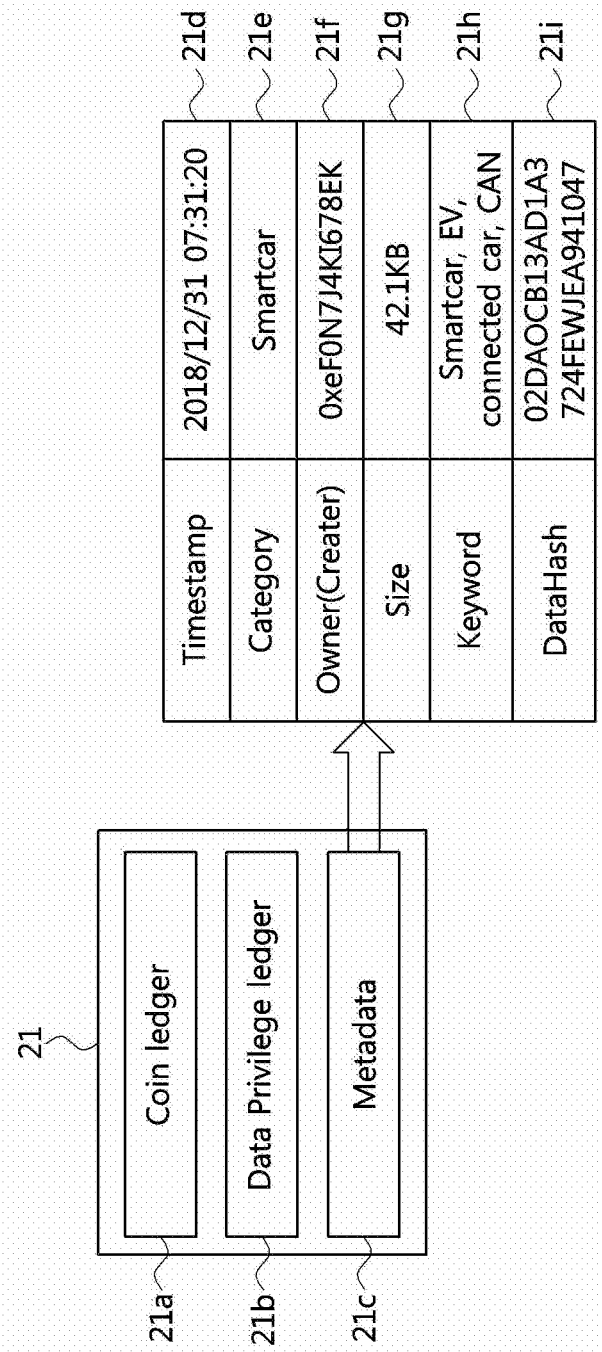
FIG. 2 is a diagram showing a configuration of a blockchain according to an example embodiment of the present invention.

FIG. 2 is a diagram showing a configuration of a blockchain according to an example embodiment of the present invention.

Referring to FIG. 2, it is possible to view a configuration of a blockchain 21 which is copied and stored in individual nodes constituting the blockchain network 20 of FIG. 1.

Specifically, the blockchain 21 may include a coin ledger 21a, a data privilege ledger 21b, and metadata 21c.

The coin ledger 21a may be a ledger storing transaction details of coins which are provided as compensation for data sharing of individual nodes constituting the blockchain network 20.

The data privilege ledger 21b is a ledger storing data ownership and a right of using data indicated by the metadata 21c. The data ownership may belong to an initial data generator and may be represented by a unique ID of the initial data generator. Also, the right of using data may not only include transfer of the right of using the data indicated by the metadata 21c and the period of use of the data but also include whether an owner has permitted data sharing (including permitted persons when only some specific persons are permitted). The metadata 21c is descriptive information used to efficiently retrieve or access data provided by various data owner terminals including an Internet of things (IoT) device, a connected car, etc. and may include path (or link) information with which it is possible to access the data provided by the data owner terminals.

Specifically, the metadata 21c may include generation times (Timestamp) 21d, categories (Category) 21e, owners (Owner or Creator) 21f, data sizes (Size) 21g, related search words or keywords (Keyword) 21h, etc. of the data provided by the data owner terminals. Also, the metadata 21c may include access paths or hash values (DataHash) 21i with which it is possible to access the data provided by the data owner terminals. The hash values 21i may be values obtained by encrypting path (or link) information, with which it is possible to access actual data, with a hash function. A Message Digest algorithm 5 (MD5) or Secure Hash Algorithm (SHA) function may be used as the hash function.

Figure 3:
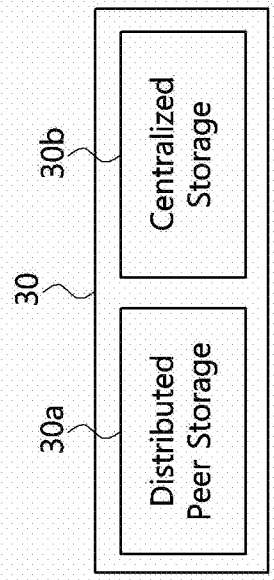
FIG. 3 is a block diagram of a distributed storage according to an example embodiment of the present invention.

FIG. 3 is a block diagram of a distributed storage according to an example embodiment of the present invention.

Referring to FIG. 3, it is possible to view a configuration of the distributed storage 30 of FIG. 1. Specifically, in the distributed storage 30 according to an example embodiment of the present invention, at least one of a distributed peer storage 30a and a centralized storage 30b may be used.

The distributed peer storage 30a is a peer-to-peer (P2P) distributed file system and may be a storage in which stored data is accessible through a hash value. Since the distributed peer storage 30a implements data storage by cloud sourcing, it is possible to reduce system maintenance cost. Also, as long as enough nodes are provided to constitute the distributed peer storage 30a, the storage capacity may be continuously increased. Further, it is possible to prevent data loss and tampering by redundantly storing stored data in other nodes. An example of the distributed peer storage 30a may be the InterPlanetary File System (IPFS). The distributed peer storage 30a may generate a hash value of a file to be uploaded and provide the hash value to a file owner, and the file owner may access the corresponding file using the hash value.

The centralized storage 30b is a distributed storage system which stores data in a distributed manner through a centralized server farm. The centralized storage 30b may be mainly used to control data, minimize the risk of data leakage, and store data sensitive to leakage through the centralized server farm. An example of the centralized storage 30b may be the Hadoop Distributed File System (HDFS). The centralized storage 30b may divide a file to be stored into blocks and store the file divided into blocks in distributed servers. In this case, the servers which store the file divided into blocks may be referred to as data nodes, and a server which manages metadata of files stored in the data nodes and inputs or outputs the files may be referred to as a name node. In other words, the centralized storage 30b may perform centralized file access through the name node.

As a distributed storage according to an example embodiment of the present invention, the above-described distributed peer storage 30a and centralized storage 30b may be used together or selectively according to the type, attribute, etc. of data to be shared. For example, data needing to be shared among some specific groups only may be stored in the centralized storage 30b, and data needing to be widely shared among a large number of external users may be stored in the distributed peer storage 30a.

Figure 4:
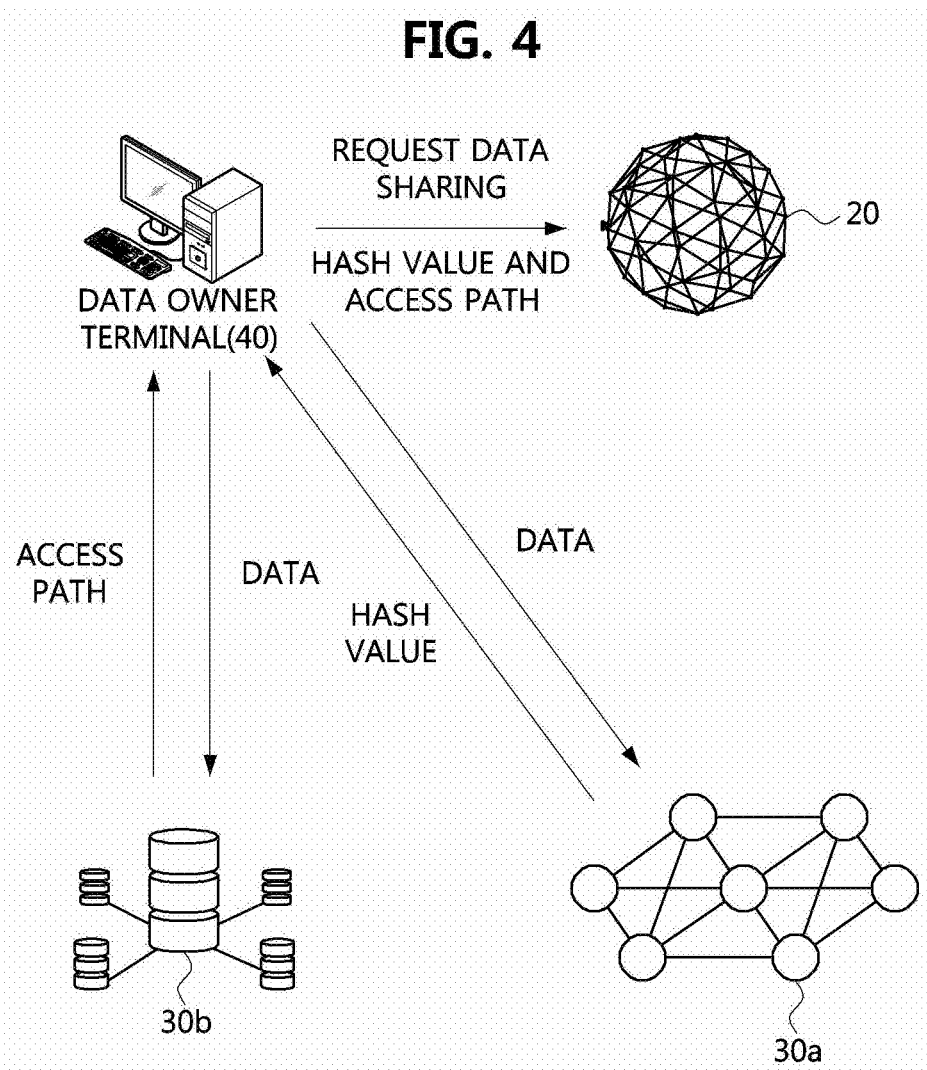
FIG. 4 is an example diagram illustrating a data sharing method in a device and method for sharing big data using a blockchain according to an example embodiment of the present invention.

FIG. 4 is an example diagram illustrating a data sharing method in a device and method for sharing big data using a blockchain according to an example embodiment of the present invention.

Referring to FIG. 4, the data owner terminal 40 may store data to be stored in the distributed peer storage 30a or the centralized storage 30b. At this time, the distributed peer storage 30a may generate a hash value for accessing the stored data and transmit the hash value to the data owner terminal 40. Also, the centralized storage 30b may generate an access path to the stored data and transmit the access path to the data owner terminal 40. More specifically, the name node of the centralized storage 30b may divide the data received from the data owner terminal 40 into blocks and store the respective blocks in a large number of data nodes in a distributed manner, and the data nodes may transmit block IDs, lengths, generation times, etc. of the blocks stored therein to the name node. The name node may manage the block IDs, lengths, generation times, etc. received from the data nodes together with IDs of the data nodes.

After storing the data in the distributed peer storage 30a or the centralized storage 30b, the data owner terminal 40 may request sharing of data including a hash value, an access path, etc. from the blockchain network 20. The individual nodes constituting the blockchain network 20 may generate metadata of a file requested for data sharing, generate a block with the generated metadata, and then connect the generated block to the blockchain.

Meanwhile, it has been described above that the data owner terminal 40 requests storage and sharing of data firsthand. However, when the data owner terminal 40 transmits a message for requesting sharing together with data to be shared to the big data sharing device 10 of FIG. 1, the big data sharing device 10 may store the data in the distributed storage 30a or 30b and request data sharing from the blockchain network 20.

Figure 5:
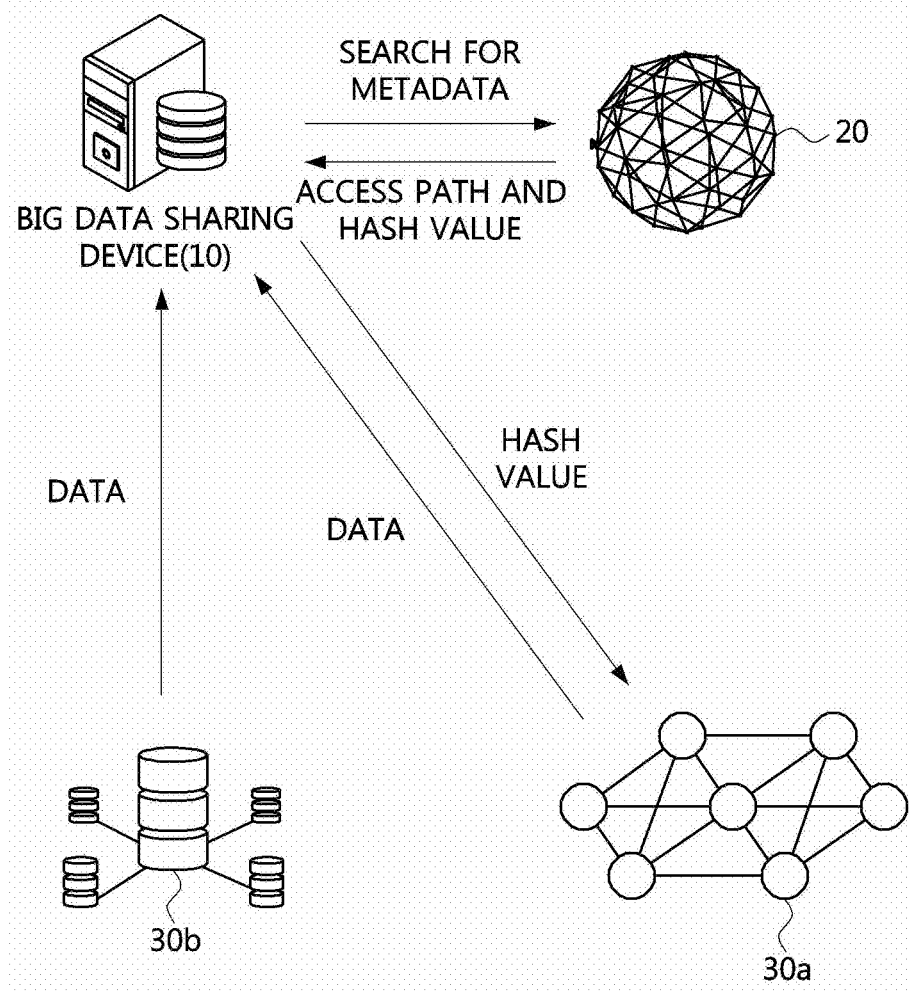
FIG. 5 is an example diagram illustrating a data acquisition method in a device and method for sharing big data using a blockchain according to an example embodiment of the present invention.

FIG. 5 is an example diagram illustrating a data acquisition method in a device and method for sharing big data using a blockchain according to an example embodiment of the present invention.

Referring to FIG. 5, the big data sharing device 10 may search the blockchain network 20 for metadata of necessary data and acquire an access path or a hash value of data indicated by metadata which is identical or similar to the searched metadata.

The big data sharing device 10 may acquire the data by accessing the centralized storage 30b through the acquired access path or acquire the data by transferring the acquired hash value to the distributed peer storage 30a.

Figure 6:
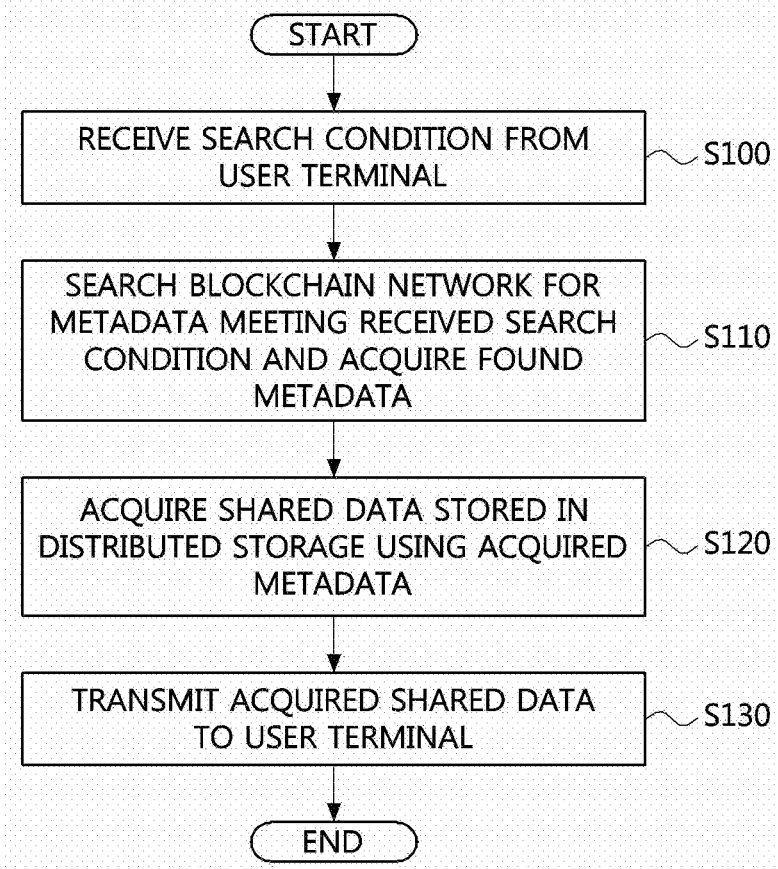
FIG. 6 is a flowchart of a method of sharing big data using a blockchain according to an example embodiment of the present invention.

FIG. 6 is a flowchart of a method of sharing big data using a blockchain according to an example embodiment of the present invention.

Referring to FIG. 6, the method of sharing big data using a blockchain may include an operation of receiving a search condition from a user terminal, an operation of searching a blockchain network for metadata meeting the received search condition and acquiring found metadata, an operation of acquiring shared data stored in a distributed storage using the acquired metadata, and an operation of transmitting the acquired shared data to the user terminal.

The method of sharing big data using a blockchain may be performed by the big data sharing device 10 of FIG. 1.

A blockchain stored in a plurality of nodes constituting the blockchain network may include the metadata and a data privilege ledger in which ownership of the data indicated by the metadata and the data usage right are defined.

The metadata may include at least one of a generation time Timestamp, a category Category, an owner or creator Owner (Creator), a data size Size, a related search word or index word Keyword, an access path, and a hash value DataHash of the data indicated by the metadata.

The distributed storage may include at least one of a distributed peer storage and a centralized storage.

After the operation of acquiring the metadata, the method may further include an operation of checking the right of using the data with reference to the data privilege ledger, an operation of acquiring an owner ID indicated by the ownership when the user terminal does not have the right of using the data, and an operation of querying a data owner terminal corresponding to the acquired owner ID whether to permit sharing of the data.

After the operation of acquiring the shared data, the method may further include an operation of determining whether the shared data has been encrypted, an operation of acquiring the owner ID indicated by the ownership when the shared data has been encrypted, and an operation of querying the data owner terminal corresponding to the acquired owner ID about a decryption key.

The operation of acquiring the shared data may include an operation of transmitting the hash value to the distributed peer storage and acquiring the shared data corresponding to the hash value.

The operation of acquiring the shared data may include an operation of acquiring the shared data by accessing the centralized storage through the access path.

Figure 7:
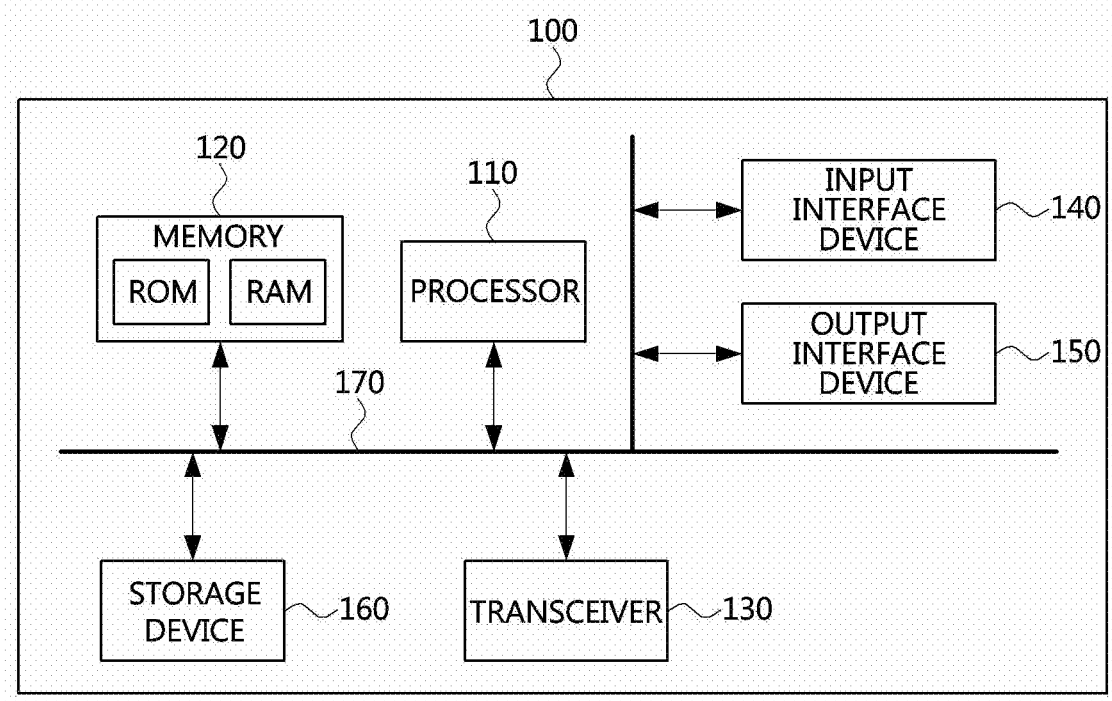
FIG. 7 is a block diagram showing a configuration of a device for sharing big data using a blockchain according to an example embodiment of the present invention.

FIG. 7 is a block diagram showing a configuration of a device for sharing big data using a blockchain according to an example embodiment of the present invention.

Referring to FIG. 7, a device 100 for sharing big data using a blockchain may include at least one processor 110 and a memory 120 storing instructions for instructing the at least one processor 110 to perform at least one operation.

The at least one processor 110 may be a central processing unit (CPU), a graphics processing unit (GPU), or a dedicated processor whereby methods according to example embodiments of the present invention are performed. Each of the memory 120 and a storage device 160 may be at least one of a volatile storage medium and a non-volatile storage medium. For example, the memory 120 may be at least one of a read-only memory (ROM) and a random access memory (RAM).

Also, the device 100 for sharing big data using a blockchain may include a transceiver 130 which performs communication via a wireless network. The device 100 for sharing big data using a blockchain may further include an input interface device 140, an output interface device 150, the storage device 160, and the like. The respective elements included in the device 100 for sharing big data using a blockchain may be connected through a bus 170 and communicate with each other.

The at least one operation may include an operation of receiving a search condition from a user terminal, an operation of searching a blockchain network for metadata meeting the received search condition and acquiring found metadata, an operation of acquiring shared data stored in a distributed storage using the acquired metadata, and an operation of transmitting the acquired shared data to the user terminal.

The device 100 for sharing big data using a blockchain may be a device which is identical to or corresponds to the big data sharing device 10 of FIG. 1.

A blockchain stored in a plurality of nodes constituting the blockchain network may include the metadata and a data privilege ledger in which ownership of the data indicated by the metadata and the right of using the data are defined.

The metadata may include at least one of a generation time Timestamp, a category Category, an owner or creator Owner (Creator), a data size Size, a related search word or index word Keyword, an access path, and a hash value DataHash of the data indicated by the metadata.

The distributed storage may include at least one of a distributed peer storage and a centralized storage.

After the operation of acquiring the metadata, the at least one operation may further include an operation of checking the right of using the data with reference to the data privilege ledger, an operation of acquiring an owner ID indicated by the ownership when the user terminal does not have the right of using the data, and an operation of querying a data owner terminal corresponding to the acquired owner ID whether to permit sharing of the data.

After the operation of acquiring the shared data, the at least one operation may further include an operation of determining whether the shared data has been encrypted, an operation of acquiring the owner ID indicated by the ownership when the shared data has been encrypted, and an operation of querying the data owner terminal corresponding to the acquired owner ID about a decryption key.

The operation of acquiring the shared data may include an operation of transmitting the hash value to the distributed peer storage and acquiring the shared data corresponding to the hash value.

The operation of acquiring the shared data may include an operation of acquiring the shared data by accessing the centralized storage through the access path.

Figure 8:
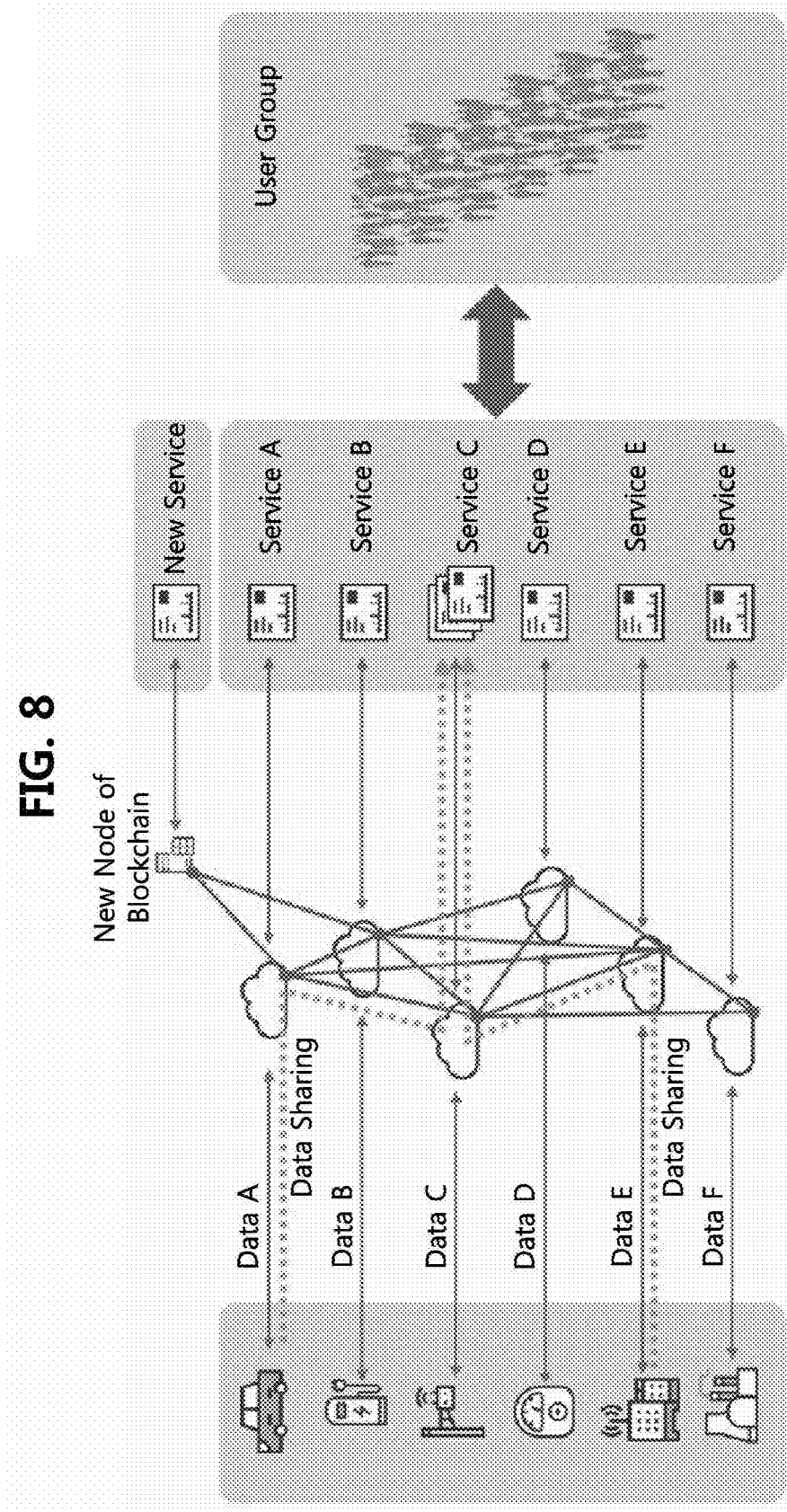
FIG. 8 is an example diagram illustrating effects of a device and method for sharing big data using a blockchain according to an example embodiment of the present invention.

FIG. 8 is an example diagram illustrating effects of a device and method for sharing big data using a blockchain according to an example embodiment of the present invention.

There are various kinds of data which form big data, and various companies want to provide such data. When such pieces of data are separately provided, it is difficult to integrate the pieces of data with each other. Therefore, it is difficult to enhance the service, maintain data, manage data, and reduce costs.

However, when the device and method for sharing big data using a blockchain according to an example embodiment of the present invention are used, it is possible to easily and conveniently share new types of data by storing only metadata of shared data in a blockchain and storing shared data which will be actually shared in a distributed storage.

For example, when a plurality of service providers separately provide individual data sharing services as shown in FIG. 8, all of the plurality of service providers may acquire and provide data using a blockchain network according to an example embodiment of the present invention. In this case, integration of data makes it possible to provide data sharing services which are far more useful.

In particular, it is possible to easily add a new service by only adding a new node to a blockchain network according to an example embodiment of the present invention such that new services may be vigorously created.

Also, since only metadata is stored using a blockchain and an access path to data to be shared is provided through only metadata, the risk of data leakage is low, and high security is provided.

When the device and method for sharing big data using a blockchain according to an example embodiment of the present invention are used, it is possible to easily and conveniently share new types of data.

Also, since a blockchain and a distributed storage are managed together, the risk of data leakage is low, and high security is provided accordingly.

While the example embodiments of the present invention and their advantages have been described in detail, it should be understood that various changes, substitutions and alterations may be made herein without departing from the scope of the invention.

What is claimed is:

1. A method of sharing big data using a blockchain, the method being performed by a big data sharing device and comprising:
    receiving a search condition from a user terminal;
    searching a blockchain network for metadata meeting the received search condition and acquiring found metadata, the blockchain network being constituted by a plurality of nodes connected each other; each of the plurality of nodes storing a blockchain, generating metadata of a data which is provided by a data owner terminal, and generating blocks using the generated metadata; and the blockchain including a data privilege ledger in which ownership of the data indicated by the metadata and the data usage right are defined;
    checking the data usage right with reference to the data privilege ledger;
    acquiring an owner identity (ID) indicated by the ownership when the user terminal does not have the data usage right;
    querying the data owner terminal corresponding to the acquired owner ID whether to permit sharing of the data;
    acquiring a permission of sharing of the data from the data owner terminal;
    acquiring shared data stored in a distributed storage using the acquired metadata and the acquired permission of sharing of the data;
    determining whether the shared data has been encrypted;
    acquiring an owner identity (ID) indicated by the ownership when the shared data has been encrypted; and
    querying the data owner terminal corresponding to the acquired owner ID about a decryption key; and
    transmitting the acquired shared data to the user terminal,
    wherein the distributed storage includes a distributed peer storage and a centralized storage, the distributed peer storage being a storage in which stored data is accessible through a hash value,
    wherein the centralized storage divides a file to be stored into blocks and store the file divided into blocks in distributed servers, and performs centralized file access through a name node to manage metadata of files stored in the distributed nodes and to input or output the files,
    wherein the name node divides the data received from the data owner terminal into blocks and store the respective blocks in a number of data nodes in a distributed manner,
    wherein the data nodes transmit block IDs, lengths and generation times of the blocks stored therein to the name node, and
    wherein the name node manages the block IDs, lengths and generation times received from the data nodes together with IDs of the data nodes.

2. The method of claim 1, wherein the metadata includes at least one of a generation time, a category, an owner or creator, a data size, a related search word or keyword, an access path, and a hash value of the data indicated by the metadata.

3. The method of claim 1, wherein the acquiring of the shared data comprises transmitting the hash value to the distributed peer storage and acquiring the shared data corresponding to the hash value.

4. The method of claim 1, wherein the acquiring of the shared data comprises acquiring the shared data by accessing the centralized storage through an access path.

5. A device for sharing big data using a blockchain, the device comprising:
    at least one processor; and
    a memory configured to store instructions for instructing the at least one processor to perform at least one operation,
    wherein the at least one operation comprises:
    receiving a search condition from a user terminal;
    searching a blockchain network for metadata meeting the received search condition and acquiring found metadata, the blockchain network being constituted by a plurality of nodes connected each other; each of the plurality of nodes storing a blockchain, generating metadata of a data which is provided by a data owner terminal, and generating blocks using the generated metadata; and the blockchain including a data privilege ledger in which ownership of the data indicated by the metadata and the data usage right are defined;
    checking the data usage right with reference to the data privilege ledger;
    acquiring an owner identity (ID) indicated by the ownership when the user terminal does not have the data usage right;
    querying the data owner terminal corresponding to the acquired owner ID whether to permit sharing of the data;
    acquiring a permission of sharing of the data from the data owner terminal;
    acquiring shared data stored in a distributed storage using the acquired metadata and the acquired permission of sharing of the data;
    determining whether the shared data has been encrypted;
    acquiring an owner identity (ID) indicated by the ownership when the shared data has been encrypted; and
    querying the data owner terminal corresponding to the acquired owner ID about a decryption key; and
    transmitting the acquired shared data to the user terminal,
    wherein the distributed storage includes a distributed peer storage and a centralized storage, the distributed peer storage being a storage in which stored data is accessible through a hash value,
    wherein the centralized storage divides a file to be stored into blocks and store the file divided into blocks in distributed servers, and performs centralized file access through a name node to manage metadata of files stored in the distributed nodes and to input or output the files, wherein the name node divides the data received from the data owner terminal into blocks and store the respective blocks in a number of data nodes in a distributed manner, wherein the data nodes transmit block IDs, lengths and generation times of the blocks stored therein to the name node, and wherein the name node manages the block IDs, lengths and generation times received from the data nodes together with IDs of the data nodes.

6. The device of claim 5, wherein the metadata includes at least one of a generation time, a category, an owner or creator, a data size, a related search word or keyword, an access path, and a hash value of the data indicated by the metadata.

7. The device of claim 5, wherein the acquiring of the shared data comprises transmitting the hash value to the distributed peer storage and acquiring the shared data corresponding to the hash value.

8. The device of claim 5, wherein the acquiring of the shared data comprises acquiring the shared data by accessing the centralized storage through an access path.

* * * * *